ENGLISH

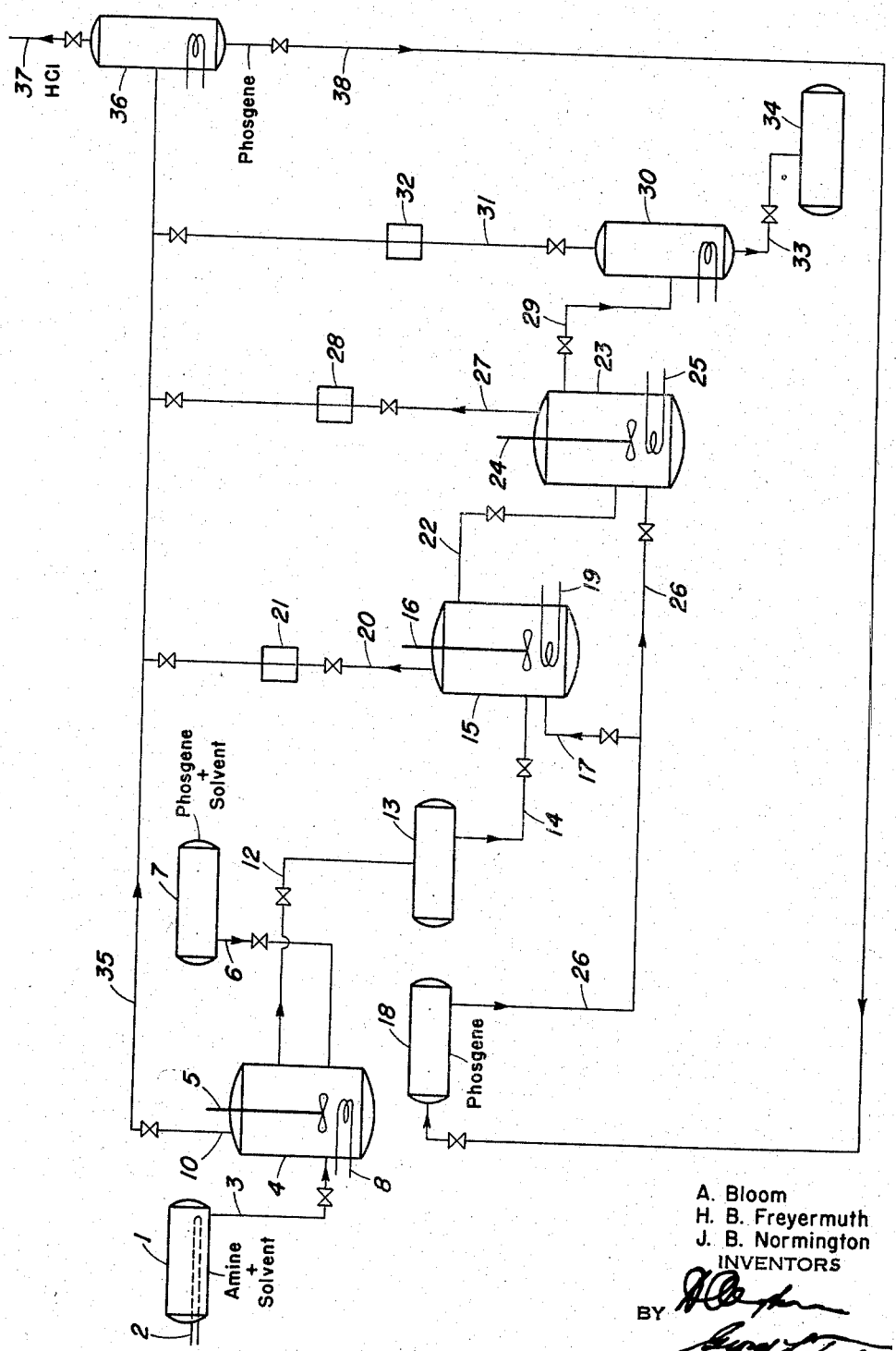

United States Patent Office 2,875,226
Patented Feb. 24, 1959

2,875,226

PROCESS FOR THE PREPARATION OF ISOCYANATES

Albert Bloom, Summit, N. J., Harlan B. Freyermuth, Easton, Pa., and James B. Normington, Little Silver, N. J., assignors to General Aniline & Film Corporation, New York, N. Y., a corporation of Delaware Application July 9, 1956, Serial No. 596,647

13 Claims. (Cl. 260—453)

This invention relates to a novel method for preparing organic isocyanates, and is applicable to the production of alkyl, cycloalkyl, alkaryl, aralkyl, aryl, hydroaryl, heterocyclic, mono-, di-, and polyisocyanates. More specifically, it is directed to an improved method of preparing organic isocyanates by reaction of a primary amine with phosgene in liquid phase, and in solution in an ether of a polyhydric alcohol.

Isocyanates find extensive use in industry, as chemical intermediates, and more particularly in the case of polyisocyanates, and, especially, aromatic diisocyanates, in the manufacture of rubber and rubber-like materials, adhesive coating agents, insulating agents, and a wide variety of other synthetic plastic materials. Isocyanates are readily prepared from the amines, corresponding to the isocyanate desired, by treatment with phosgene. Due to the tendency of amines to form ureas on reaction with phosgene, especially at the temperatures used for the production of the isocyanates, the usual methods for producing isocyanates from the corresponding amines are as follows: a salt of the amine with a volatile acid, e. g., the carbonate or the hydrochloride of the amine, corresponding to the isocyanate desired, is first prepared and this salt is then reacted with phosgene to form the isocyanate, or, alternatively, the free amine may first be treated with phosgene—at a low temperature—to form an intermediate reaction product, which is believed to be a mixture of carbamyl chloride and hydro-chloride; and this intermediate reaction product is then subjected to further treatment with phosgene, preferably at an elevated temperature, in order to produce the desired isocyanate.

This method of synthesis of isocyanates, by reaction of the free amine with phosgene, may be illustrated by the production of toluylenediisocyanate from toluene diamines. In this synthesis, a tolylene diamine is dissolved in a solvent, such as ortho dichlorobenzene and treated with phosgene at a low temperature, preferably of from 0 to 5°. This gives rise to a mixture in which the main component, quite probably, is the carbamyl chloride hydrochloride,

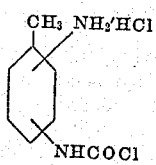

although it is probable that some of the dicarbamyl chloride

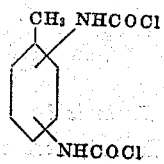

and the dihydrochloride

are also formed. However, since these will also react with phosgene to form the isocyanate, and since the dihydrochloride and the dicarbamyl chloride are formed in the same proportions, as though a single product, the carbamyl chloride-hydrochloride, were formed, the overall reaction of the toluene diamine with phosgene, at a low temperature, may be formulated conveniently, as indicated by Reaction #1:

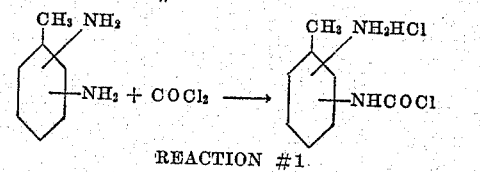

REACTION #1

This intermediate product, carbamyl chloride-hydrochloride, is an insoluble material, and when the reaction mixture is heated up, remains insoluble. By insoluble we do not means that there is a complete absence of solubility, but, rather, that there is limited solubility. Now the reaction mixture is further treated with phosgene at an elevated temperature, preferably at about 140–160° C., and the carbamyl chloride-hydrochloride is then converted to the diisocyanate, as shown by Reaction #2:

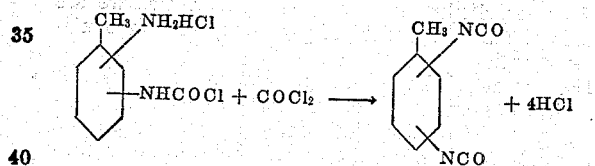

REACTION #2

The finished reaction mixture, after degassing, is fractionated to remove the solvent and separate the pure diisocyanate. This leaves a considerable residue of polymers and by-product in the still pot. This residue is removed from the still pot and, on treatment with caustic, there is recovered a quantity of tolylene diamine. The higher the amount of residue, the lower the yield of toluene diisocyanate. It has been shown, for example, that, by prolonging the distillation time, by-products or polymers are produced. To overcome this prolonged reaction time, it has been proposed that the phosgenation step be conducted at super-atmospheric pressures. For example, in U. S. Patent 2,642,449 the inventor claims that the reaction time can be reduced from 20 to 40 hours to as low as several minutes by conducting the phosgenation at super-atmospheric pressures. Since there is an inherent danger in handling phosgene under pressure, at high temperatures, it was, therefore, desirable that a process for the manufacture of isocyanates, in which the reaction rate was fast and the yield high, be conducted at atmospheric pressure.

As indicated above, the prior art has commonly carried out the synthesis of diisocyanates from the amine or amine hydrochloride, by effecting the reaction in an inert solvent. The following solvents or suspending agents have been disclosed in the patent and chemical literature, U. S. 2,261,156, toluene; U. S. 2,689,861, xylene; U. S. 2,643,264, chlorobenzene, orthodichlorobenzene, toluene, xylene and tetrahydronaphthalene; U. S. 2,642,449, benzene, chlorbenzene, toluene, and chlortoluenes; U. S. 2,362,648, toluene; U. S. 2,683,160, chlorinated aromatic hydrocarbons; U. S. 2,680,130, benzene, chlorbenzene, dichlorbenzene, toluene, xylene, nitrobenzene, cyclohexane, kerosene, carbontetrachloride, tetrachlorethylene, trichlorethylene, trichlorbenzene, decahydronaphthalene, tetrahydronaphthalene, amylbenzene, ortho meta and paracymenes, dodecylbenzene, naphthalene, heptylcyopentane, diphenyl and partially hydrogenated aromatic hydrocarbons, boiling above 340° C.; U. S. 2,680,129, halogenated organic solvents boiling at about 275–400° C., such as chlorinated diphenyls; U. S. 2,340,757, xylene; U. S. 2,640,068, toluene and heptane; U. S. 2,374,340, decahydronaphthalene, amylbenzene, tetrahydronaphthalene and cymene; U. S. 2,326,501, chlorbenzene, toluene and trichlorobenzene; U. S. 2,683,727 and U. S. 2,683,729, both disclosed toluene; U. S. 2,625,561, dioxane, dibutyl ether, benzene and toluene are disclosed.

However, while numerous solvents have heretofore been suggested for use in the synthesis of organic isocyanates, they are subject to the objection that, due, at least in part, to the relative insolubility of the amine hydrochloride, or carbamyl chloride therein, an extremely prolonged reaction time is required, which results in formation of substantial amounts of by-products and polymers; thus, adversely affecting the yield of desired isocyanates.

It is the object of this invention to disclose a process for the manufacture of isocyanates by an economic, technically feasible method, giving a high yield of pure isocyanate in a relatively short time. It is a further object of this invention to disclose that the above-mentioned process can be conducted in a continuous manner.

We have found that, in the production of isocyanates by the reaction of phosgene on an amine while using, as the solvent for the reaction, the ethers or polyethers of polyhydric alcohols, as for example, ethylene glycol diethylether, diethylene glycol diethylether, etc., we are able to obtain a high yield of pure isocyanate in a relatively short time.

The characteristics of this process are such that it lends itself to continuous operation, and the single figure of the attached drawing is a flow chart of a preferred equipment for practising the present invention in a continuous manner.

We particularly prefer, as solvents for the reaction, the dialkyl ethers of either mono-, di-, or trialkylene glycols. The following formulae are illustrative of the dialkyl ethers of mono-, di-, and trialkylene glycols that are employed as solvents in practising the present invention:

$$ROCH_2CH_2OR$$

Dialkyl ethers of ethylene glycol $$ROCH_2CH_2OCH_2CH_2OR$$

Dialkyl ethers of diethylene glycol $$ROCH_2CH_2OCH_2CH_2OCH_2CH_2OR$$

Dialkyl ethers of triethylene glycol $$CH_3CH(OR)CH_2OR$$

Dialkyl ethers of propylene glycol $$CH_3CH(OR)CH_2OCH_2CH(OR)CH_3$$

Dialkyl ethers of dipropylene glycol $$ROCH_2CH(C_2H_5)CH(OR)C_3H_7$$

2-ethylhexane-1,3-dialkyl ether $$CH_3CH(OR)CH_2CH(OR)CH_3$$

Pentanediol-2,4-dialkylether $$CH_3C(OR)(CH_3)CH_2CH(OR)CH_3$$

Dialkyl ethers of hexylene glycol wherein each R represents an alkyl group containing from 1 to 5 carbon atoms.

It is to be noted that any one of the above dialkyl ethers may be either symmetrical or unsymmetrical. A large number of them are commercially available and the others are well known compounds being described in patent and technical literature. In view of this, it is not deemed necessary to give a specific example of each, i. e., symmetrical and unsymmetrical types, since those skilled in the art will have no difficulty in making the selection from the above formulae. As a clear-cut guide, it may be desirable, however to give specific illustrations of a given type, such as, for example, the dialkyl ethers of diethylene glycol, which are as follows:

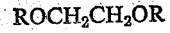
Dimethyl ether of diethylene glycol
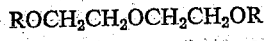
Diethyl ether of diethylene glycol
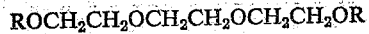
Dipropyl ether of diethylene glycol
Dibutyl ether of diethylene glycol
Methyl ethyl ether of diethylene glycol
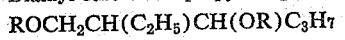
Methyl propyl ether of diethylene glycol
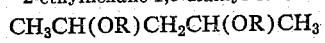
Ethyl propyl ether of diethylene glycol
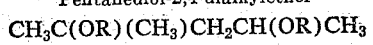
Propyl butyl ether of diethylene glycol The above-mentioned ethers have the following favorable characteristics:

1. Good solvents for phosgene
2. Good solvents for amines
3. Produce a finely dispersed carbamyl chloride slurry The process of the present invention has been found to be of particular interest, and, particularly, valuable for the production of aromatic diisocyanates by the reaction of phosgene, with an aromatic diamine in solution in an ether or polyether of a polyhydric alcohol of the type mentioned above. However, it should be understood that the process is equally applicable to the production of organic isocyanates generally; i. e., aliphatic, cycloaliphatic, alkaryl, aralkyl, heterocyclic and aryl mono-, di- and polyisocyanates. Illustrative examples of these isocyanates, which may be prepared in accordance with the process of the present invention, by reaction of phosgene with the corresponding amine, are hexyl isocyanate from hexylamine, octyl isocyanate from octylamine, dodecyl isocyanate from dodecylamine, octadecyl isocyanate from octadecylamine, tetramethylene diisocyanate from tetramethylenediamine, pentamethylene diisocyanate from pentamethylenediamine, octamethylene diisocyanate from octamethylenediamine, dodecamethylene diisocyanate from docecamethylenediamine, 3,3′ diisocyanato dipropylether from 3,3′-diaminodipropylether, etc.; cyclohexyl isocyanate from cyclohexylamine, tetrahydro-α-naphthyl isocyanate from tetrahydro-α-naphthylamine, tetrahydro-β-naphthyl isocyanate from tetrahydro-β-naphthylamine, etc.; xylylene diisocyanates from xylylenediamines, diphenylmethane 4,4′-diisocyanate from 4,4′-diaminodiphenylmethane, β,β′-diphenylpropane 4,4′-diisocyanate from 4,4′-diamino-β,β-diphenylpropane, etc.; benzyl isocyanate from benzylamine, undecamethylene diisocyanate from undecamethylenediamine, phenylethyl isocyanate from phenylethyl amine, p-isocyanato benzyl isocyanate from p-amino-benzylamine, etc.; phenyl isocyanate from aniline, p-cetyl phenyl isocyanate from p-cetylaniline, p-dodecylphenyl isocyanate from p-dodecylaniline, 5-dodecyl-2-methylphenyl isocyanate from 5 - dodecyl - o - toluidine, 3 - nitro - 4 - dodecylphenisocyanate from 3-nitro-4-dodecyl aniline, p-cetyloxyphenyl isocyanate from p-cetyloxyaniline, metaphenylene diisocyanate from metaphenylenediamine, p-phenylene diisocyanate from p-phenylenediamine, 1-methyl phenylene-2, 4-diisocyanate from 1-methyl phenylene-2,4-diamine, naphthylene 1,4-diisocyanate from 1,4-naphthylenediamine, 2,6-tolylene diisocyanate from 2,6-toluenediamine, 1,3,5-benzene triisocyanate from 1,3,5-benzene triamine, etc.; tetrahydrofurfuryl isocyanate from tetrahydrofurfurylamine, etc.

The details of the present invention will be apparent to those skilled in the art from consideration of the following specific examples:

*Example 1*

Into a 2-liter, 4-neck flask were charged 609 grams diethyl Carbitol (diethyl ether of diethylene glycol). This solvent was cooled and stirred to 0–10° C. and 140 grams of phosgene were passed in at this temperature. 122 grams of a mixture of 2-4 and 2-6 tolylene diamine were dissolved in 203 grams of diethyl Carbitol (diethyl ether of diethylene glycol) by heating to 100° C. This hot solution was then added dropwise to the phosgene solution at 0–10° C. over about 20 minutes. A fine slurry resulted. This mixture was stirred and heated to 100–165° C. over a period of about 1½ hours, while passing phosgene gas through the mixture at a rate of approximately 1 gram per minute. After solution was complete, the phosgenation was continued for a short additional time. At this time, the solution was cooled to 100° C. and degassed with dry nitrogen until free of volatile acids. The weight of the crude material amounted to 981 grams. From this crude material, a mixture of 2-4 and 2-6 tolylene diisocyanates were isolated by fractional distillation. A yield of about 92% of theory was obtained. This purified material analyzed 99% diisocyanate.

Two specific mixtures of 2-4 and 2-6 tolylene diamine have been used in operating in accordance with the foregoing example. One of these mixtures consisted of about 80% 2,4-tolylenediamine and 20% 2,6-tolylene diamine, obtained by mono-nitrating toluene, whereby there was obtained a mixture of 2-nitrotoluene and 4-nitrotoluene, which mixture was then further nitrated without separation of these isomers to produce a mixture 2,4-dinitro toluene and 2,6-dinitro toluene, which was then reduced to give the above 80:20 mixture of 2,4- and 2,6-tolylene diamines. The other mixture consisted of about 65% 2,4-tolylene diamine and 35% 2,6-tolylene diamine, obtained by mono-nitrating toluene and separating the thus produced 2-nitro toluene from the 4-nitro toluene, followed by further nitration of the 2-nitro toluene to produce a mixture of 2,4-dinitro toluene and 2,6-dinitro toluene, which was then reduced to give the 65:35 mixture of the 2,4- and 2,6-tolylene diamines. The yield of tolylene diisocyanate was the same in both instances, the only difference being the ratio of the 2,4- and 2,6-isomers. Pure 2,4-tolylene diisocyanate was also produced in the same manner, and yield, by using pure 2,4-tolylene diamine in place of the mixture of isomeric tolylene diamines. The pure 2,4-tolylene diamine had been prepared by mononitrating toluene, followed by separation of the thus produced 2-nitro toluene from 4-nitro toluene, followed by further nitration of the thus recovered 4-nitro toluene to produce pure 2,4-dinitro toluene, which was then reduced to give pure 2,4-tolylene damine.

Other aromatic polyisocyanates have also been produced in good yield and high purity, following the procedure outlined above. Since the only change necessary in the procedure already described is the use, in place of 122 grams (1 mole) of the tolylene diamines, of an equivalent amount (1 mole) of the aromatic diamine corresponding to the diisocyanate desired, examples of aromatic diamines which, when treated in the manner described above and converted to diisocyanates of high purity and in good yield, are given below in tabular form

TABLE I

| Aromatic Diamine | Amount of diamine used (grams) | Diisocyanate obtained |
| --- | --- | --- |
| metaphenylene diamine | 108 | m-phenylene diisocyanate. |
| paraphenylene diamine | 108 | p-phenylene diisocyanate. |
| benzidine | 184 | 4,4'-di-isocyanatodiphenyl. |
| o-tolidine | 212 | 3,3'-dimethyl-4,4'-diisocyanato diphenyl. |
| dianisidine | 244 | 3,3'-dimethoxy-4,4'-diisocyanato diphenyl. |

Example 2

The procedure of Example 1 was repeated, except that 214 grams of benzylamine were used in place of the 122 grams of the mixed 2-4 and 2-6-tolylenediamines. There was thus obtained benzyl isocyanate in a yield of about 85% of theory, and having a purity of 99% isocyanate.

In the production of aromatic isocyanates by the process of the present invention, it is preferred to start with the free amine and react this with phosgene at a low temperature to form the carbamyl chloride-hydrochloride which is then converted to the isocyanate by reaction with further amounts of phosgene, at an elevated temperature in the manner described in the foregoing examples. However, if desired, the amine to be converted to the isocyanate may first be converted to its salt with a volatile acid (e. g. to the carbonate or hydrochloride) and the amine salt reacted with phosgene at an elevated temperature to obtain the desired isocyanate. This latter method is usually preferred for the production of alkyl isocyanates from the corresponding alkyl amines, and is illustrated by the following example of the production of hexamethylene diisocyanate from hexamethylene diamine.

Example 3

Into a 2-liter, 4-neck flask pass 100 parts of carbon dioxide into a cooled (0–10° C.) solution of 116 parts of hexamethylenediamine in 812 parts of diethyl Carbitol (diethyl ether of diethylene glycol) with rapid agitation. Heat the thus produced carbonate slurry of hexamethylenediamine in diethyl Carbitol (diethyl ether of diethylene glycol) to 160–165° C. while passing in phosgene over a period of 1 to 2 hours. There was thus produced a solution which was further processed as in Example 1. There was then obtained hexamethylene diisocyanate in a yield of about 90% of theory, and having a purity of 99% diisocyanate.

The foregoing examples are illustrative of preferred methods of producing isocyanates by the process of the present invention, and those skilled in the art can readily make such modifications as may be necessary to adapt the present process to the production of a particular isocyanate. As an illustration of the type of change which may be desirable in producing a particular isocyanate, may be mentioned, the production of triphenylmethane-4,4',4''-triisocyanate from 4,4',4''-triaminotriphenylmethane where, due to the somewhat lower solubility of the carbamyl chloride and hydrochloride, it is preferable to use a greater proportion of solvent as illustrated by the following example.

Example 4

A cooled solution of phosgene in diethyl Carbitol (diethyl ether of diethylene glycol) was prepared in a 2-liter, 4-neck flask by passing 95 grams of phosgene into 609 grams of diethyl Carbitol (diethyl ether of diethylene glycol) in the flask, while stirring and cooling to 0–10° C. 193 grams of 4,4',4''-triamino-triphenylmethane were dissolved in 603 grams of diethyl Carbitol (diethyl ether of diethylene glycol) by heating to 100° C. This hot solution was then added, dropwise, to the phosgene solution at 0–10° C. over about 20 minutes. The resulting fine slurry was stirred and heated to 100–165° C. over a period of about ½ hour, while passing phosgene gas through the mixture at a rate of approximately 1 gram per minute. After solution was complete, the phosgenation was continued for a short additional time and the solution was then degassed with dry nitrogen, until free of volatile acids. The thus produced triphenylmethane 4,4',4''-triisocyanate was recovered by distilling off the solvent, diethyl Carbitol (diethyl ether of diethylene glycol), under vacuum.

It has also been found that the process of the present invention is readily adaptable to the production of organic aryl isocyanates, from the corresponding nitro compounds. When it is desired to start with the nitro compound, rather than the amine, the starting nitro compound, corresponding to the isocyanate desired as the final product, may be reduced by catalytic hydrogenation to the amine in solution in the solvent to be employed for the conversion of the amine to the isocyanate in the phosgenation reaction; and the crude amine, without separation from the solvent, may be subjected to hydrogenation in the manner more fully described above. This method of operation, i. e., carrying out reduction of the nitro compound to the amine, and the phosgenation of the thus obtained amine to the diisocyanate in solution in a single solvent, is particularly advantageous in the production of aromatic diisocyanates, starting with the corresponding aromatic dinitro compound.

Catalytic hydrogenation in an inert solvent, including solvents of the type contemplated in the present invention, is described in the copending application of David E. Graham, Serial No. 563,411, filed February 6, 1956. When it is desired to start with the nitro compound, the reduction of the nitro compound to the amine may be effected as described in subject Graham application, using, as a solvent for the hydrogenation, an ether of a polyhydric alcohol of the type heretofore mentioned. On completion of the hydrogenation, the thus obtained solution of amine in an ether of a polyhydric alcohol, may, after removal of catalyst and a drying treatment (but without further purification), be subjected to the action of phosgene, in the manner heretofore described.

In order to more fully illustrate the production of organic isocyanates from a corresponding nitro compound, the following specific example thereof is given:

*Example 5*

A 2-liter, steel shaker-type autoclave was charged with 160 parts of mixed 2,4- and 2,6-dinitrotoluene, dissolved in 640 parts of diethyl Carbitol (diethyl ether of diethylene glycol). To this solution there was added 1 part of a commercial 5% palladium on charcoal catalyst (0.05 part palladium). The autoclave was then purged of air with hydrogen gas, and hydrogen gas was then fed in while shaking, to maintain a pressure of 80 p. s. i. g. The temperature was maintained at 75° C. In about 3–5 hours the theoretical amount of hydrogen for the production of mixed tolylene diamines had been absorbed, and pressure was then released. The catalyst was filtered from the solution, and assay of a sample of the thus obtained solution, by coupling with diazotized p-toluidine indicated a yield of 91–3% of mixed tolylene diamines. The water of reaction was then removed by distillation to a pot temperature of 150° C. In a 2-liter, 4-necked flask there was then charged 200 grams of diethyl Carbitol (diethyl ether of diethylene glycol), which was cooled and stirred at 0 to 10° C., and 96 grams of phosgene were passed in at this temperature. The dried solution of mixed tolylene diamines and diethyl Carbitol (diethyl ether of diethylene glycol), obtained, as described above, was then added, dropwise, in the solution, at 0 to 10° C., over 37 minutes. A fine slurry resulted. The mixture was stirred and heated to 100 to 165° C., over a period of about one-half hour, while passing phosgene gas through the mixture at the rate of about 1.6 grams per minute. After solution was complete, the phosgenation was continued for a short additional time. The solution was then cooled to 100° C., and degassed with dry nitrogen, until free of volatile acids. The solvent was removed by distillation, and 160 parts of crude material was obtained. From this crude material a mixture of 2,4- and 2,6-tolylenediisocyanate were isolated by fractional distillation. The purified material analyzed 99% diisocyanate. A yield of about 83–7% of theory, based on mixed dinitro toluene, was obtained.

As previously indicated, the process of the present invention is readily conducted in a continuous manner, and reference should now be made to the accompanying drawings, in which the single figure is a flow chart of a preferred form of apparatus suitable for use when the process of the present invention is to be operated in a continuous manner. The details of the continuous operation of the process of this invention will be apparent from the following description of the production of a mixture of isomeric tolylene diisocyanates from a mixture of isomeric tolylene diamines, using diethyl Carbitol (diethyl ether of diethylene glycol) as the solvent and using the apparatus illustrated in the drawings.

In the drawing, 1 represents a storage tank for solution of the amine (e. g. mixed isomeric tolylene diamines) to be converted to isocyanate (e. g., mixed isomeric tolylene diisocyanates) in solvent (e. g., diethyl Carbitol (diethyl ether of diethylene glycol) to be employed for the reaction. Heating means, such as steam coil 2, may be provided in this tank to maintain a sufficiently elevated temperature about 100° C., so that the amine is completely dissolved in the solvent. From storage tank 1, the solution of amine in solvent (about 60 parts by weight of tolylene diamines in 100 parts diethyl Carbitol (diethyl ether of diethylene glycol) is continuously fed through valved line 3, into reaction vessel 4, equipped with suitable agitating means, such as stirrer 5. In reaction vessel 4, the solution of amine in solvent, which may be at a temperature of about 100° C., is introduced into a bath of phosgene in the same solvent (about 60 parts by weight of phosgene in 300 parts of diethyl Carbitol (diethyl ether of diethylene glycol), at a low temperature, preferable 0–10° C.; the solution of phosgene in solvent being introduced continuously into the reaction vessel 4, through valved line 6, from storage tank 7. Suitable temperature control means, such as cooling coil 8, may be supplied in reaction vessel 4, in order to maintain the temperature of the reaction mass within the desired range.

The rate of feed of the phosgene solution and the tolylene diamine solution to reactor 4 are adjusted so that an excess of phosgene over that theoretically required to form the carbamyl chloride-hydrochloride is furnished, about 1.1 to 1.4 moles of phosgene being supplied per mole of diamine. In reaction vessel 4, the amine and phosgene react at low temperature to form the carbamyl chloride-hydrochloride, as indicated in Reaction 1, above. Reaction vessel 4 is preferably maintained at atmospheric pressure, and, for safety, may be vented through valved line 10.

The slurry of carbamyl chloride-hydrochloride in diethyl Carbitol (diethyl ether of diethylene glycol) formed in reactor 4, is drawn therefrom through valved line 12, to storage or surge tank 13, and is withdrawn therefrom through valved line 14, and introduced into reaction vessel 15, equipped with suitable agitating means, such as stirrer 16.

In reaction vessel 15, phosgene, preferably an excess over that theoretically required for the conversion of the carbamyl chloride-hydrochloride to the diisocyanate (e. g. about 1 to 3 moles of phosgene per mole of carbamyl chloride-hydrochloride) is introduced through valved line 17, from storage tank 18. The reaction mixture in reaction vessel 15 is heated to desired temperature (e. g. 100–160° C.) by suitable means, such as steam-heating coil 19. The reaction vessel 15 is preferably maintained at atmospheric pressure, and HCl formed therein and unreacted phosgene may be withdrawn therefrom through valved line 20, having condenser 21 therein. The residence time in vessel 15 may be approximately 30 to 60 minutes. The product is withdrawn from reaction vessel 15, through valved line 22, and introduced into second reaction vessel 23, equipped with suitable agitating means, such as stirrer 24, and heating means, such as steam coil 25. Further phosgene (about 0.1 to 0.5 mole of phosgene per mole of carbamyl chloride-hydrochloride and diisocyanate, calculated as diamine supplied to reactor 23) is continuously introduced into reaction vessel 23, through valved line 26 from storage tank 18. HCl and phosgene may be removed from reactor vessel 23 through valved line 27, having condenser 28 therein; and the product consisting essentially of the desired isocyanate in solvent may be removed from reaction vessel 23, through valved line 29 to degassing still 30. Gases, mostly HCl and phosgene are removed overhead from still 30, through valved line 31, having reflux condenser 32 therein. The solution of mixed tolylene diisocyanates in diethyl Carbitol are removed from still 30, through valved line 33 and collected in storaged or surge tank 34.

Gases withdrawn from the reactors 15 and 23, and degassing still 30 through lines 20 and 27, respectively, and manifold 35, are introduced into suitable recovery means, such as still 36, from which HCl and other gaseous impurities may be withdrawn through valved line 37, and phosgene withdrawn through valved line 38 and returned to phosgene storage tank 18.

The product in storage tank 34 may be worked up in any suitable manner.

We claim:

1. In the process for the preparation of aromatic polyisocyanates wherein an aromatic polyamine is reacted with phosgene at a low temperature and in an inert organic solvent to produce a slurry of the carbamyl chloride- hydrochloride of said polyamine in said solvent and the thus obtained slurry is reacted at an elevated temperature in the range of 100 to 200° C. with further phosgene whereby carbamyl chloride-hydrochloride reacts with the phosgene to form a polyisocyanate and the thus obtained polyisocyanate is recovered; the improvement which comprises forming a solution of phosgene in an inert organic solvent selected from the group consisting of dialkyl ethers of mono-, di- and trialkylene glycols and introducing the polyamine into the thus formed solution of phosgene to thereby form the slurry of the carbamyl chloride-hydrochloride and heating the thus formed slurry in the same solvent to a temperature of 100 to 200° C. while introducing further phosgene whereby the polyisocyanate is formed.

2. The process as defined in claim 1 wherein the inert solvent specified is a lower alkyl ether of diethylene glycol in which the alkyl groups contain from 1 to 4 carbon atoms.

3. The process as defined in claim 2 wherein the inert solvent specified is diethyl ether of diethylene glycol.

4. The process as defined in claim 1 wherein the aromatic polyamine specified is a toluene diamine whereby the aromatic polyisocyanate recovered is a tolylene diisocyanate.

5. The process as defined in claim 4 wherein the inert organic solvent specified is a lower dialkyl ether of diethylene glycol in which the alkyl groups contain from 1 to 4 carbon atoms.

6. The process as defined in claim 5 wherein the inert organic solvent specified is diethyl ether of diethylene glycol.

7. In the process of preparing aromatic polyisocyanates from the corresponding aromatic polynitro compounds wherein the aromatic polynitro compound in solution in an inert organic solvent is reduced to the corresponding polynitro compound by hydrogenation with hydrogen in the presence of a hydrogenating catalyst and the resulting solution of amino compound freed of water and then converted to the corresponding polyisocyanate by reaction in said inert organic solvent and at a low temperature with phosgene to produce a slurry in said solvent of the carbamyl chloride-hydrochloride corresponding to the said polyamino and said slurry is then reacted with additional phosgene at an elevated temperature within the range of 100 to 200° C. whereby the carbamyl chloride-hydrochloride reacts with the phosgene to form the corresponding polyisocyanate, and the thus obtained polyisocyanate recovered; the improvement which comprises employing as the solvent specified in the hydrogenation step a member of the group consisting of dialkyl ethers of mono-, di- and trialkylene glycols and wherein the organic polyamine specified is recovered in solution in said solvent and added to a solution of phosgene in the same solvent and at a low temperature.

8. The process as defined in claim 7 wherein the inert organic solvent specified is a lower dialkyl ether of diethylene glycol in which the alkyl groups contain from 1 to 4 carbon atoms.

9. The process as defined in claim 8 wherein the inert organic solvent specified is diethyl ether of diethylene glycol.

10. The process as defined in claim 7 wherein the aromatic polynitro compound specified is an aromatic dinitro compound whereby the organic polyisocyanate recovered is an organic diisocyanate.

11. The process as defined in claim 7 wherein the organic polynitro compound specified is a dinitro toluene and whereby the organic polyisocyanate recovered is a tolylene diisocyanate.

12. The process as defined in claim 11 wherein the inert organic solvent specified is a lower dialkyl ether of diethylene glycol in which the alkyl groups contain from 1 to 4 carbon atoms.

13. The process as defined in claim 12 wherein the inert organic solvent specified is diethyl ether of diethylene glycol.

References Cited in the file of this patent

UNITED STATES PATENTS

| | | |
|---|---|---|
| 2,625,561 | Werntz | Jan. 13, 1953 |
| 2,706,733 | Reid | Apr. 19, 1955 |

OTHER REFERENCES

Synthetic Organic Chemicals, Carbide & Carbon Chemicals Corp., 10th ed., Oct. 15, 1940 (p. 20 relied upon).